S. ROGOWSKI.
TROLLEY.
APPLICATION FILED MAY 10, 1911.
1,027,281.
Patented May 21, 1912.
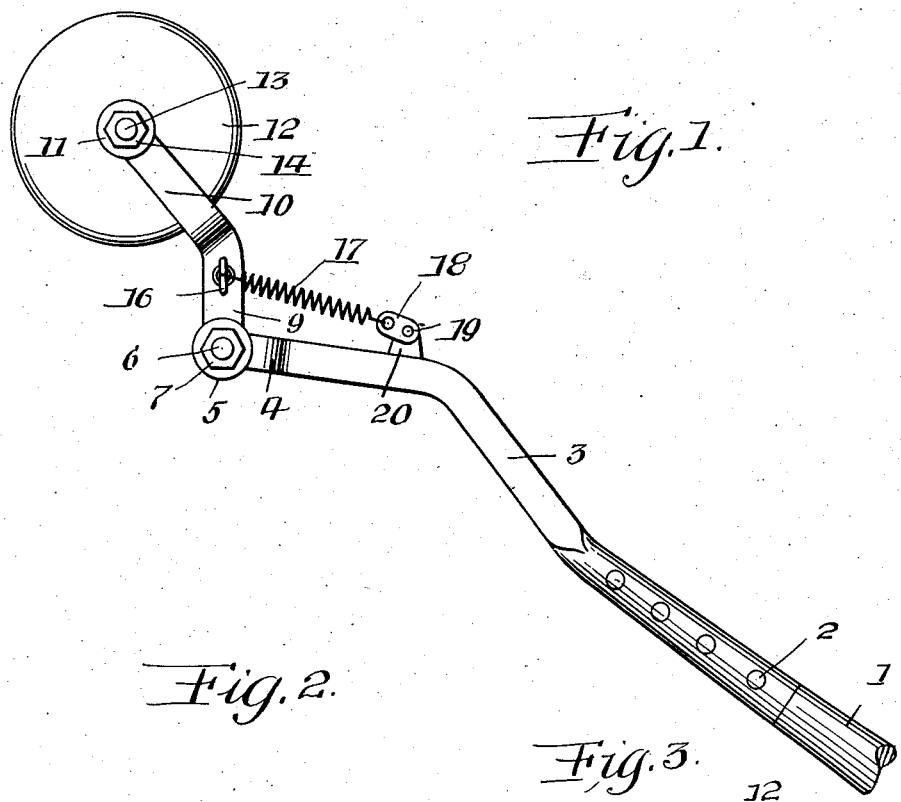
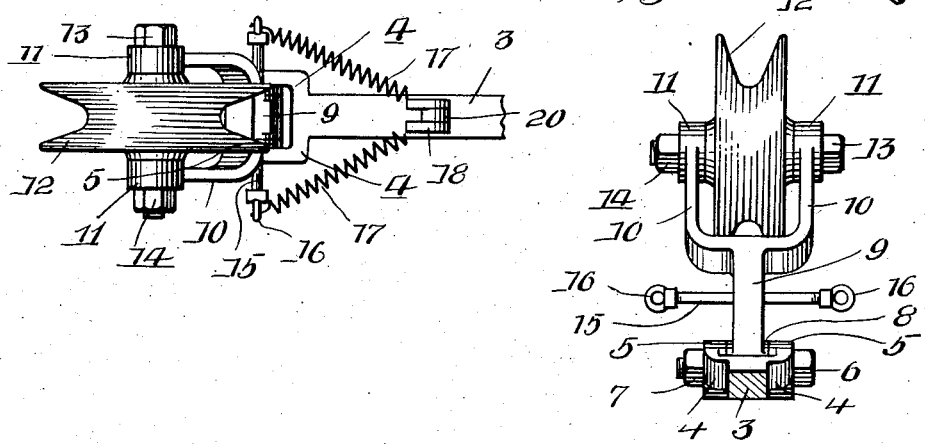
WITNESSES:
Samuel Payne
K. H. Butler
INVENTOR.
S. Rogowski.
BY
ATTORNEYS.

UNITED STATES PATENT OFFICE.

STANISLAW ROGOWSKI, OF HARMONY, RHODE ISLAND.

TROLLEY.

1,027,281.  Specification of Letters Patent.  Patented May 21, 1912.

Application filed May 10, 1911. Serial No. 626,309.

*To all whom it may concern:*

Be it known that I, STANISLAW ROGOWSKI, a subject of the Czar of Russia, residing at Harmony, in the county of Providence and State of Rhode Island, have invented certain new and useful Improvements in Trolleys, of which the following is a specification, reference being had therein to the accompanying drawing.

This invention relates to trolleys, and the purpose of the invention is to provide a trolley that can be advantageously used in connection with suburban high speed railways, the trolley being designed whereby it will normally remain in engagement with the trolley wire or electric conductor, thereby maintaining electrical connections that insure perfect control of a car, when descending steep grades or rounding curves.

A further purpose of the invention is to provide a trolley harp that can be used in connection with the present type of trolley pole, the harp being constructed whereby it will yield when trolley hangers, guard rails or irregularities are encountered upon the trolley wire.

One embodiment of the invention is shown in the accompanying drawing, wherein:—

Figure 1 is a side elevation of the trolley, Fig. 2 is a plan of the same, and Fig. 3 is a front elevation of the trolley.

The reference numeral 1 denotes a portion of a pole and riveted or otherwise secured to the upper end of the pole, as at 2 is a support 3, including an upper and a lower inclined member, said support having the upper member bifurcated to provide arms 4. The upper ends of the arms 4 have apertured bosses 5 and pivotally mounted between said bosses by a bolt 6 and a nut 7 is the enlarged lower end 8 of a harp shank 9. The shank 9 has the upper end thereof bifurcated to provide arms 10 and these arms have apertured bearings 11 for a revoluble grooved trolley wheel 12. The trolley wheel 12 is revolubly mounted upon a bolt 13 mounted within the bearings 11 and retained therein by a nut 14.

The shank 9 of the harp has outwardly extending side brackets 15 with the outer end of each bracket provided with an eye 16. Connected to the eye 16 are the upper convolutions of coiled retractile springs 17, said springs having the lower convolutions thereof connected to links 18 pivotally mounted upon a pin 19, carried by a lug 20 of the support 3 whereby the lower portions of the springs can swing upon pivots when occasion so requires, thereby overcoming wear upon the lower terminus of the springs, under such conditions increasing the life of the lower connected ends of the springs.

The tension of the springs 17 is adapted to normally maintain the trolley wheel 12 in engagement with a trolley wire or electric conductor, said springs coöperating with the pivoted harp in compensating for any unequal distance of the normal distance between the upper end of the support 3 and the trolley wire.

What I claim is:—

A trolley comprising a pole, a support fixed to the pole having that portion projecting from the pole extending at two different inclinations, the farther end of said support being enlarged and bifurcated, a harp including a shank, the arms of said harp being disposed at an angle with respect to the shank, said shank pivotally connected to the bifurcated end of said support, a pair of lateral projecting brackets carried by said shank, said brackets extending in opposite directions with respect to each other and having their combined length greater than the width of the harp, a lug carried by the upper portion of said support, a pair of links pivotally connected to said lugs at each side thereof, and coiled retractile springs attached at their upper ends to the outer ends of the said brackets and at their other ends to the free ends of said links, and a trolley wheel revolubly mounted in the harp.

In testimony whereof I affix my signature in the presence of two witnesses.

STANISLAW ROGOWSKI.

Witnesses:
ARTHUR P. FARLEY,
FRANK L. HANLEY.